(12) United States Patent
Marrah et al.

(10) Patent No.: US 6,917,794 B2
(45) Date of Patent: Jul. 12, 2005

(54) PHASE COMPENSATION CIRCUIT

(75) Inventors: Jeffrey Joseph Marrah, Kokomo, IN (US); Linh Ngoc Pham, Kokomo, IN (US); Rohail Andrew Pervez, Kokomo, IN (US); Myron Glen Padgett, Greentown, IN (US); Richard Albert Kennedy, Kokomo, IN (US); Matthew James Yarosz, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 644 days.

(21) Appl. No.: 09/828,250

(22) Filed: Apr. 9, 2001

(65) Prior Publication Data
US 2002/0146994 A1 Oct. 10, 2002

(51) Int. Cl.[7] .................................................. H04B 1/06
(52) U.S. Cl. ...................................... 455/276.1; 65/137
(58) Field of Search ............................ 455/276.1, 272, 455/279.1, 137, 65; 375/347

(56) References Cited

U.S. PATENT DOCUMENTS

| 4,293,955 A | 10/1981 | Gehr et al. |
| 4,970,472 A | 11/1990 | Kennedy et al. |
| 5,517,686 A | 5/1996 | Kennedy et al. |
| 5,828,699 A | * 10/1998 | Heinemann ................. 375/230 |
| 6,510,396 B1 | 1/2003 | Colosky |

FOREIGN PATENT DOCUMENTS

EP         1 033 781         9/2000

OTHER PUBLICATIONS

European Search Report dated Dec. 21, 2004

* cited by examiner

Primary Examiner—Lee Nguyen
(74) Attorney, Agent, or Firm—Stefan V. Chmielewski

(57) ABSTRACT

A phase compensation circuit, for use with an FM reception system, includes a delay circuit and a control circuit. The delay circuit receives a composite input signal that exhibits a variable phase error and provides a plurality of selectable discrete delays. The control circuit is coupled to the delay circuit and receives a control signal whose value corresponds to the phase error associated with the composite input signal. The control circuit selects one of the plurality of selectable discrete delays responsive to the control signal, which is utilized to delay the composite input signal to provide a phase compensated composite output signal.

14 Claims, 6 Drawing Sheets

PHASE COMPENSATION CIRCUIT

TECHNICAL FIELD

The present invention is generally directed to a frequency modulation (FM) reception system and, more specifically, to an FM reception system that implements an intermediate frequency (IF) filter with dynamic bandwidth control in combination with a phased array antenna diversity system.

BACKGROUND OF THE INVENTION

Traditionally, superheterodyne receivers have utilized a frequency translation method to shift a frequency spectrum passed by a relatively wideband radio frequency (RF) front-end to a somewhat narrow passband of an intermediate frequency (IF) section. IF filters of the IF section of the receiver have generally provided selectively sufficient to isolate a desired signal and an IF amplifier has typically amplified the signal provided to a detector. Historically, FM reception systems have usually implemented a narrow IF filter passband to provide greater attenuation of adjacent channels. However, a narrow IF filter passband may corrupt both the amplitude and phase of modulation sidebands of the desired channel. An IF filter that corrupts the modulation sidebands of the desired channel typically generates distortion in a detected baseband audio signal.

Recently, FM reception systems have implemented dynamic IF filter bandwidth control. This feature allows IF filters to remain relatively wide when there is no adjacent channel interference. However, in the event that modulation sidebands of an adjacent channel begin to encroach into a desired channel, the IF filter narrows to mitigate the affects of the interference. As a general rule, the distortion that is generated in the desired channel, when the IF filter bandwidth is momentarily narrowed, is preferable to the interruption that occurs when the adjacent channel is allowed to interfere with the desired channel.

Systems that have employed dynamic IF filter bandwidth control have typically utilized one of two designs. A first design has reduced the IF filter bandwidth in the presence of a strong adjacent channel. A second design has reduced the IF filter bandwidth at low RF and/or low modulation levels. In the second design case, the IF filter bandwidth reduction is typically proportional to the modulation and reception conditions. In both designs, a bandwidth control monitor voltage has normally provided a direct current (DC) representation of the status of the IF filter bandwidth. In systems implementing these designs, a lower bandwidth control monitor voltage usually indicates that the IF filter is operating at maximum bandwidth, whereas a higher bandwidth control monitor voltage typically indicates a narrow IF filter bandwidth. These systems have also normally utilized a linear transition between the minimum and maximum bandwidth control monitor voltage.

Some high quality FM reception systems have also implemented antenna diversity. Antenna diversity systems generally reduce the effects of receiving multipath signals, implement at least two antennas and may include circuitry for combining the signals from multiple antennas. Two basic approaches have normally been utilized within FM reception systems that implement antenna diversity. The first approach is known as switched diversity, where the FM reception system chooses the best antenna and discards received signals from the other antenna(s). The second approach is known as phased array, where the phase of the received signals, from multiple antennas, is aligned and the received signals are combined to provide a composite antenna signal. One known phased array antenna diversity system, that utilizes two antennas, is described in U.S. Pat. No. 5,517,686, which discloses an adaptive reception system (ARS) that amplitude modulates one antenna vector with a set frequency and phase signal. In this system, a detector of an FM radio provides an FM composite signal that is utilized by the ARS to align the received signals. The ARS compares the phase of the FM composite signal with a modulated signal and produces an error voltage to align the phase of one of the received signals with the sum of the two received signals.

In FM reception systems that implement both dynamic IF filter bandwidth control and phased array antenna diversity, the different group delays produced by the IF filter, as its bandwidth is dynamically varied, effects the ability of the ARS to function properly. That is, a reduction in the bandwidth proportionally increases the phase delay of the FM composite signal provided to the ARS. As previously mentioned, the FM composite signal is utilized by the ARS to determine the amount of phase shift that needs to be applied to the received signal from one of the antennas so that the signals received from each antenna are aligned. As currently designed, these FM reception systems cannot differentiate between a phase difference in the received signals and a phase shift caused by dynamically varying the bandwidth of the IF filter and, as such, the performance of these systems may widely vary.

Thus, what is needed is a phase compensation circuit that improves the performance of an FM reception system that implements IF filter bandwidth control in combination with a phased array antenna diversity system.

SUMMARY OF THE INVENTION

An embodiment of the present invention is directed to a phase compensation circuit that includes a delay circuit and a control circuit. The delay circuit receives a composite input signal that exhibits a variable phase error and provides a plurality of selectable discrete delays. The control circuit is coupled to the delay circuit and receives a control signal whose value corresponds to the phase error associated with the composite input signal. The control circuit selects one of the plurality of selectable discrete delays responsive to the control signal, which is utilized to delay the composite input signal to provide a phase compensated composite output signal.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS(S)

The present invention is directed to a phase compensation circuit that allows an FM reception system to advantageously implement IF filter bandwidth control in combination with a phased array antenna diversity system. The phase compensation circuit includes a delay circuit and a control circuit. The delay circuit receives an FM composite input signal that exhibits a variable phase error and provides a plurality of selectable discrete delays. The control circuit is coupled to the delay circuit and receives a control signal whose value corresponds to the phase error associated with the composite input signal. The control circuit selects one of the plurality of selectable discrete delays responsive to the control signal, which is utilized to delay the composite input signal to provide a phase compensated FM composite output signal.

Figure 1:
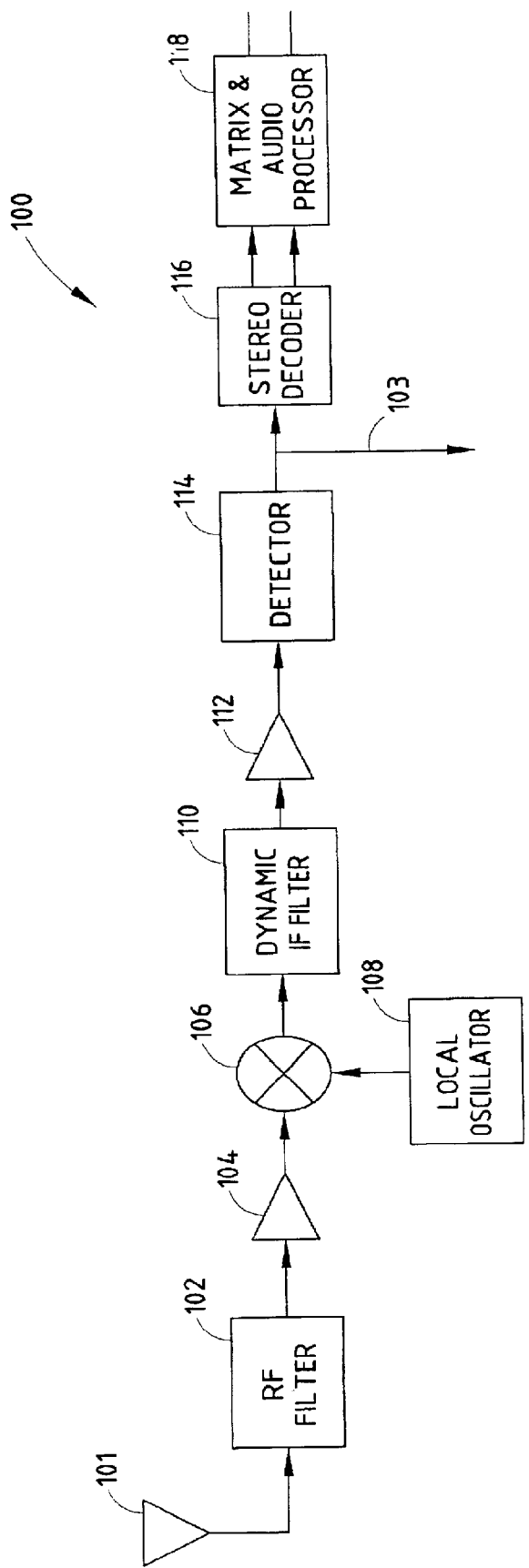
FIG. 1 is an electrical block diagram of an FM receiver that implements dynamic intermediate frequency (IF) bandwidth selectivity.

FIG. 1 depicts a block diagram of an exemplary FM receiver 100 that includes dynamic intermediate frequency (IF) filter bandwidth selectivity. An antenna 101 receives a transmitted signal and provides the received signal to a RF bandpass filter 102, which provides wideband RF selectivity. The bandpass filter 102 provides the filtered received signal to an RF amplifier 104, which amplifies the received signal and provides the signal to a mixer 106. The mixer 106 receives an input from a local oscillator 108, whose frequency translates the incoming signal in frequency such that the desired station frequency falls within the pass band of a dynamic intermediate frequency (IF) filter 110, thus allowing selection of the desired channel. The desired channel and its sidebands are passed by the IF filter 110, whose bandwidth varies as a function of the strength of the channels adjacent to the desired channel. The dynamic IF filter 110 is coupled to an IF amplifier 112, which amplifies the desired channel and provides it to a detector 114. An output of the detector 114 is coupled to a stereo-decoder 116, which is coupled to an audio processor 118. The output of the detector 114 may also provide an FM composite input signal 103 that may be routed to an adaptive reception system (ARS).

Figure 2:
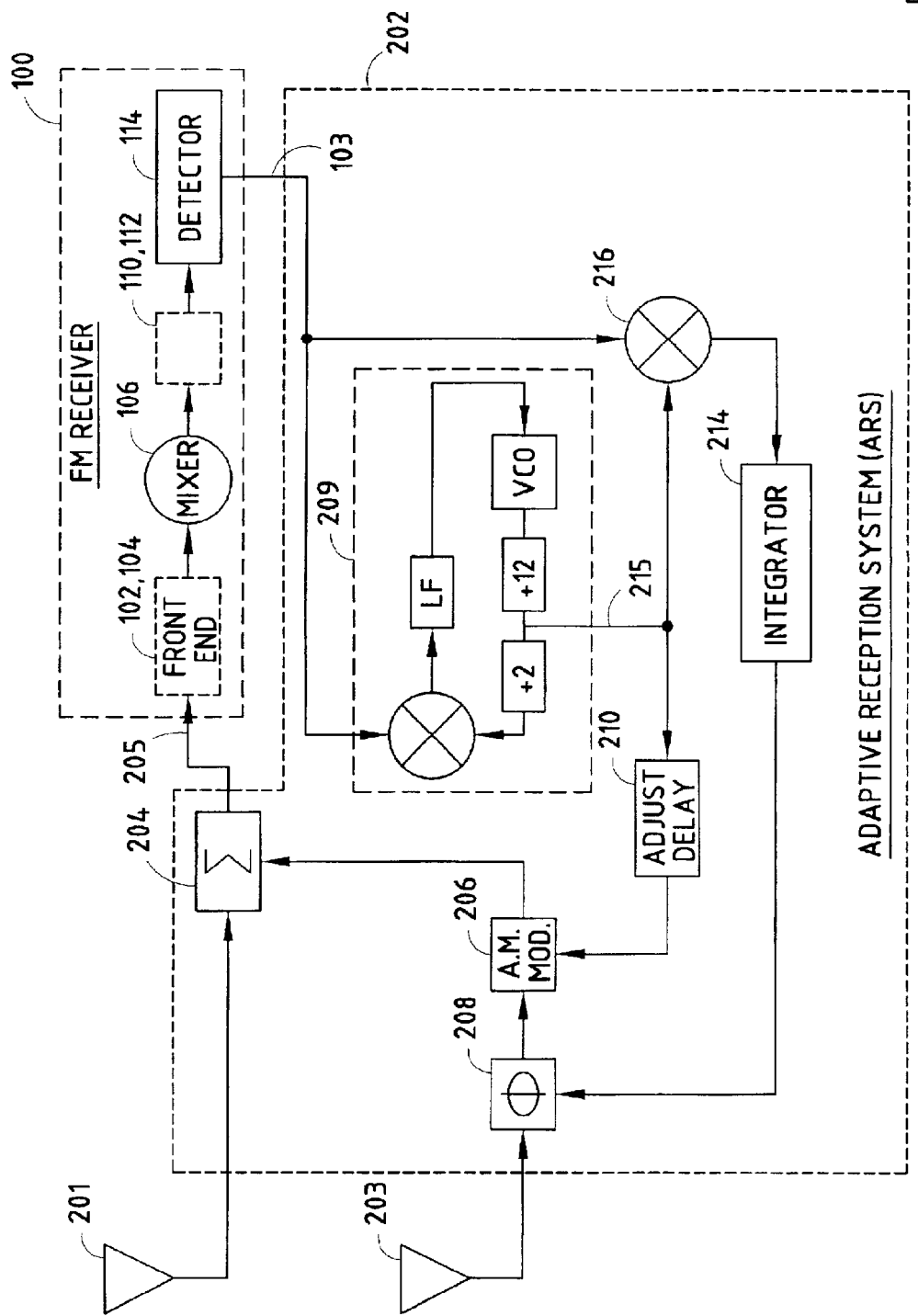
FIG. 2 is an electrical block diagram of an adaptive reception system (ARS)

FIG. 2 depicts the FM receiver 100 coupled to an adaptive reception system (ARS) 202. As previously discussed, a typical ARS implements a plurality of antennas. As shown in FIG. 2, the ARS 202 utilizes two antennas 201 and 203. The antenna 203 is coupled to a phase shifter 208, which is coupled to an amplitude modulation (AM) section 206. The modulation section 206 provides a phase shifted signal from the antenna 203 to a combiner 204. The combiner 204 functions to combine the signals received by the antennas 201 and 203 and provides a composite antenna signal 205 to the front-end (102 and 104) of the FM receiver 100.

As previously discussed, the detector 114 of the FM receiver 100 provides an FM composite input signal 103 to the ARS 202. The FM composite input signal 103 is provided to a phase-locked loop 209 of the ARS 202 and a multiplier 216 of the ARS 202. An output 215 of the phase-locked loop 209 is provided to the multiplier 216 and an adjustable delay section 210. The adjustable delay section 210 is coupled to the modulation section 206. The output of the multiplier 216 is provided to an integrator 214, which provides a phase control voltage to the phase shifter 208.

The phase control voltage is utilized to shift the signal received by the antenna 203 to align the phase of the signals received by the antennas 201 and 203. As previously mentioned, phase errors created by dynamically varying the bandwidth of the IF filter 110 in the FM receiver 100 results in a change in the phase of the FM composite input signal 103. As stated above, this is undesirable in that the ARS 202 cannot differentiate phase shift caused by the IF filter 110 from phase shift attributable to the signals received by the antennas 201 and 203. As a result, the ARS 202 may incorrectly adjust the phase relationship of the antenna signals received from the antennas 201 and 203.

Figure 3:
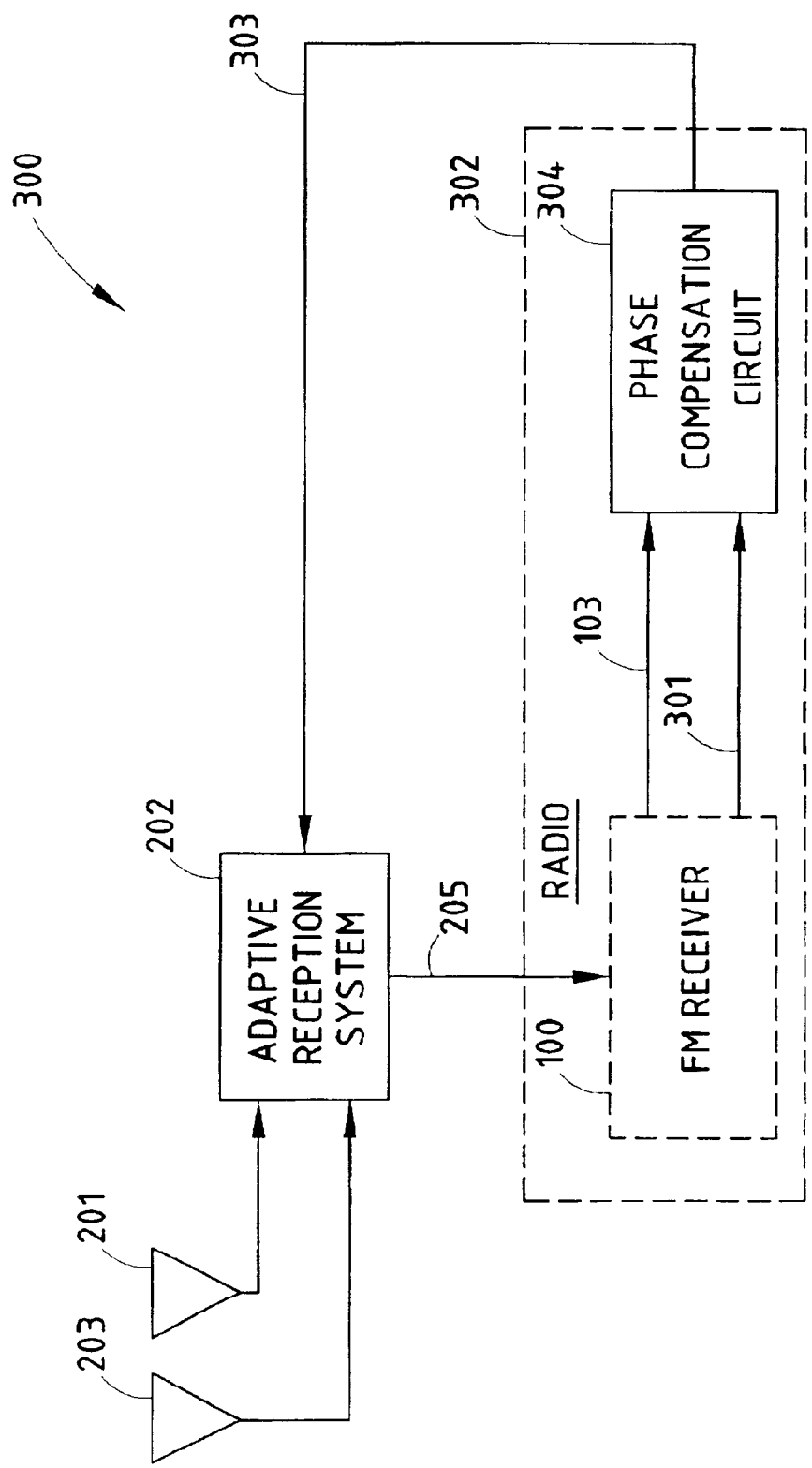
FIG. 3 is an electrical block diagram of an FM reception system that implements dynamic IF bandwidth control in combination with a phased array antenna diversity system and a phase compensation circuit, according to an embodiment of the present invention.

FIG. 3 depicts an electrical block diagram of an FM reception system 300 that includes an FM receiver 100, an adaptive reception system (ARS) 202 and a phase compensation circuit 304, according to an embodiment of the present invention. As discussed in conjunction with FIG. 2, the ARS 202 receives transmitted signals from the antennas 201 and 203. These received signals are combined and provided to a front-end of the FM receiver 100. The FM receiver 100 includes a dynamic IF filter that provides a control signal (i.e., a bandwidth control monitor voltage) 301 that is proportional to the bandwidth of the IF filter. That control signal 301 is provided to the phase compensation circuit 304, which selects an appropriate delay for the FM composite input signal 103, which is then provided to the ARS 202. The phase compensation circuit 304 provides a phase compensated FM composite output signal 303 to the ARS 202 such that the ARS 202 can properly function to align the received signals, from the antennas 201 and 203, as the bandwidth of the IF filter of the FM receiver 100 is dynamically varied.

Figure 4:
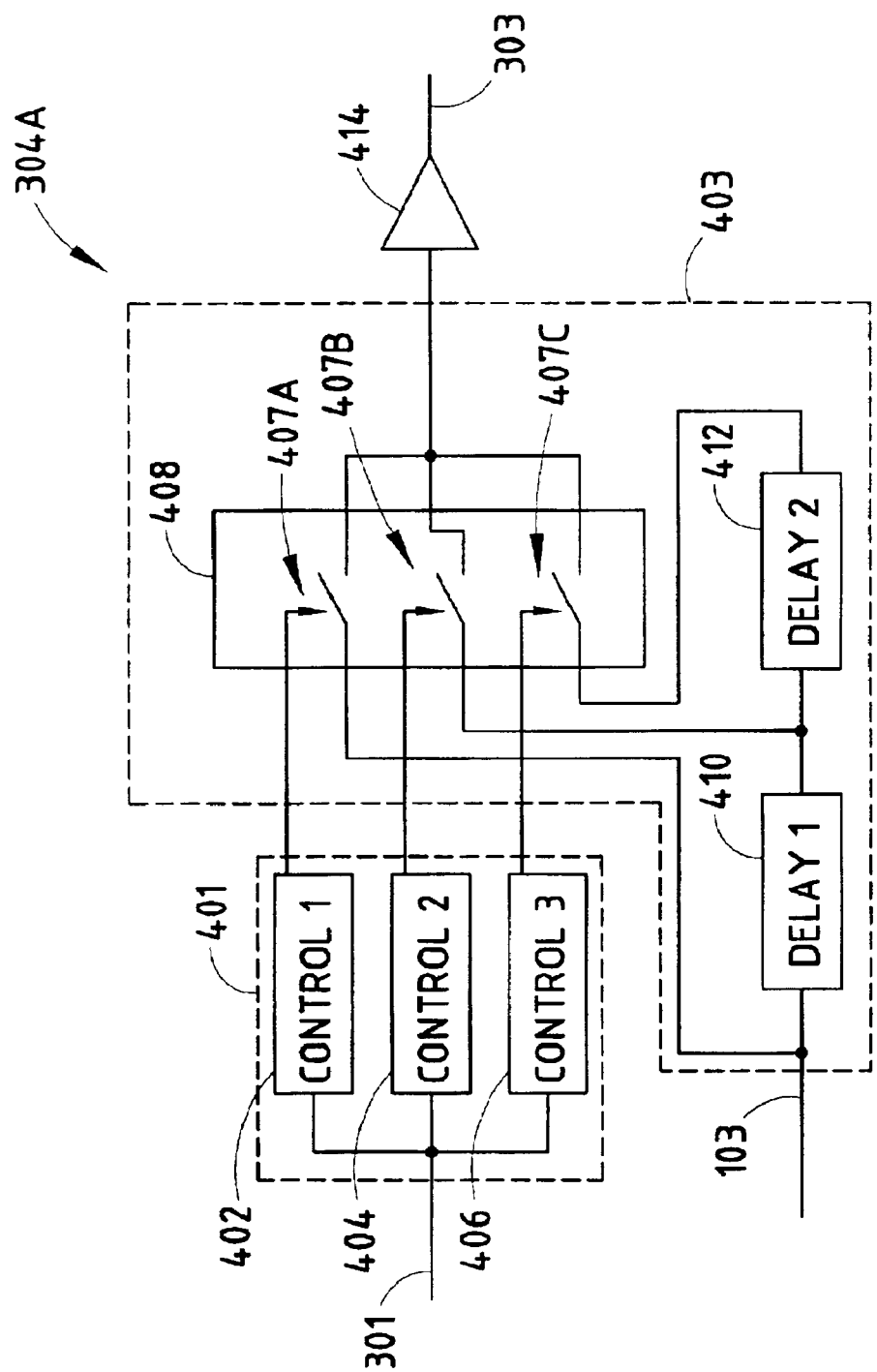
FIG. 4 is an electrical block diagram of a phase compensation circuit, according to one embodiment of the present invention.

FIG. 4 depicts an electrical block diagram of a phase compensation circuit 304A, according to one embodiment of the present invention. As previously discussed, the control signal 301, which is proportional to the IF filter bandwidth, is provided to a control circuit 401. The control circuit 401 includes a plurality of circuits 402, 404 and 406, which have set thresholds that allow the control circuit 401 to select one of a plurality of selectable discrete delays responsive to the control signal 301. As previously mentioned, the selected delay is utilized to delay the composite input signal 103 to provide the phase compensated composite FM output signal 303 to the ARS 202. Based upon the level of the control signal 301, provided to the control circuit 401, the control circuit 401 causes an appropriate switch 407A, 407B or 407C (preferably located within a switch matrix 408) to close. This causes the FM composite input signal 103 (from the detector of the FM receiver 100) to be provided (after an appropriate delay) to the ARS 202, via buffer 414. That is, based upon the level of the control signal 301, received from the FM receiver 100, the control circuit 401 activates an appropriate one of the switches 407A, 407B and 407C, thereby selecting an appropriate delay.

When the control voltage is at its minimum (e.g., 0.7 volts), the bandwidth of the IF filter is at its maximum. As such, a full delay is selected, when the bandwidth of the IF filter is at its maximum, since the IF filter produces a minimum phase shift at maximum bandwidth. When the control voltage is at its maximum (e.g., 1.8 volts), the bandwidth of the IF filter is at its minimum and no additional delay is required, since the IF filter produces a maximum phase shift at minimum bandwidth. When the control voltage is between its minimum and maximum (e.g., 1.1 volts), an appropriate delay (e.g., a one-half delay) is initiated. Since an ARS typically utilizes a set frequency, it is desirable to design a delay circuit that provides appropriate delays at the frequency of the ARS. The total amount of delay is dictated by the maximum amount of delay attributable to the IF filter implemented. This delay can typically be determined by simulation or can be determined with a bench set-up. Preferably, the phase compensation circuit 304A does not significantly alter the level of the composite input signal 103 or, alternatively, provides a gain to offset any attenuation.

Referring again to FIG. 4, when the level of the control signal 301 (e.g., 1.8 volts), received by the control circuit 401, indicates that no delay is desired, the FM composite input signal 103 is routed through switch 407A and buffer 414 to the ARS 202. When the level of the control signal 301 (e.g., 1.1 volts) provided by the FM receiver 100 indicates that a delay corresponding to an one-half delay is required, the FM composite input signal 103 is routed through the delay block 410, through switch 407B and buffer 414 to the ARS 202. When the level of the control signal 301 (e.g., 0.7 volts) indicates a maximum delay is desired, the FM composite input signal 103 is routed through the delay block 410, a delay block 412, the switch 407C and the buffer 414. Thus, the control circuit 401 selects one of the plurality of selectable discrete delays (included within delay circuit 403) responsive to the level of the control signal 301 and thereby provides a phase compensated composite output signal 303 to the ARS 202.

Figure 5:
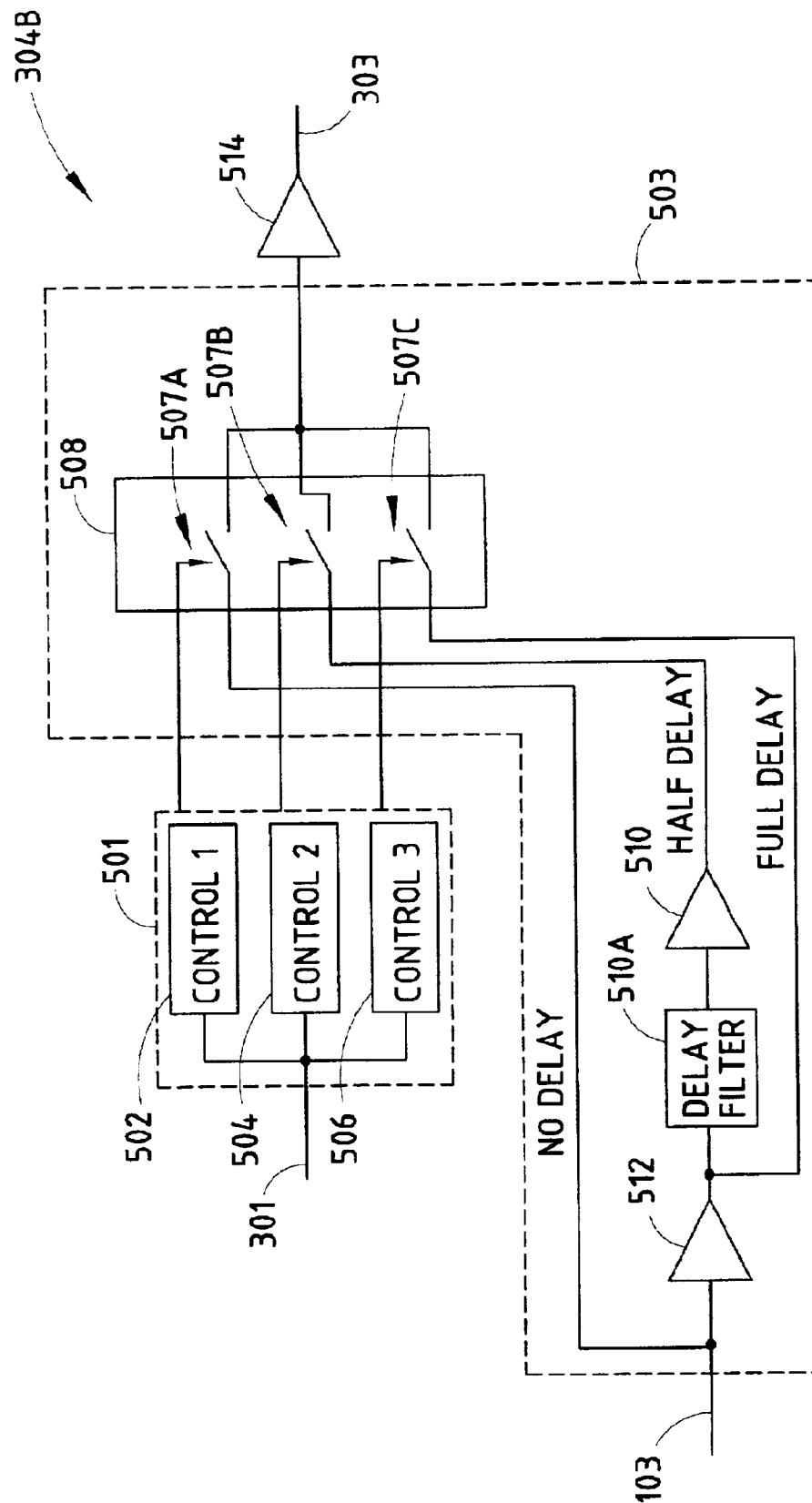
FIG. 5 is an electrical block diagram of a phase compensation circuit, according to another embodiment of the present invention.

FIG. 5 illustrates a phase compensation circuit 304B, according to another embodiment of the present invention. The phase compensation circuit 304B of FIG. 5 is similar to the phase compensation circuit 304A of FIG. 4. One difference between the phase compensation network 304A and the phase compensation circuit 304B is that an inverting amplifier 512 (and its associated components) provides a total delay, as opposed to the delay blocks 410 and 412. Another difference between the phase compensation network 304A and the phase compensation circuit 304B is that a delay filter 510A and an inverting amplifier 510 (and its associated components) in combination with the inverting amplifier 512 provides a one-half delay, as opposed to the delay block 410. The inverting amplifier 512 provides an effective delay of one-half cycle (i.e., a full delay) by forcing the ARS control loop to lock 180 degrees out of phase relative to the lock condition when the inverting amplifier 512 is not in the delay path.

The phase compensation circuit 304B includes a control circuit 501 that includes a plurality of circuits 502, 504 and 506, which function to control an appropriate one of the switches 507A, 507B and 507C, in switch matrix 508, according to the level of the control signal 301 received by the control circuit 501.

In this manner, the FM composite input signal 103 can be delayed by an appropriate amount. For example, if the level of the control signal 301, received by the control circuit 501, indicates that no delay is desired, then the circuit 501 initiates closure of the switch 507A. If the level of the control signal 301 indicates that a one-half delay is desired, then the circuit 501 initiates closure of the switch 507B. Finally, if the level of the control signal 301 received by the control circuit 501 indicates that a full delay is desired, then the circuit 501 initiates closure of the switch 507C.

When no delay is desired, the FM composite input signal 103 is routed through switch 507A and buffer 514. When a one-half delay is desired, the FM composite input signal 103 is routed through the inverting amplifier 512, the delay filter 510A, the inverting amplifier 510, the switch 507B and the buffer 514. When a full delay is desired, the FM composite input signal 103 is routed through the inverting amplifier 512, the switch 507C and the buffer 514. Thus, the control circuit 501 selects one of the plurality of selectable discrete delays (included within delay circuit 503) responsive to the level of the control signal 301 and thereby provides a phase compensated composite output signal 303 to the ARS 202. Similar to the buffer 414, of FIG. 4, the buffer 514 provides isolation for the phase compensation circuit.

While only three delays have been illustrated in FIGS. 4 and 5, one of ordinary skill in the art will appreciate that with minor modifications to the present invention, a greater or lesser number of divisions (e.g., one-quarter, one-half, three-quarter and full) in a total delay can be incremented. Further, it should be appreciated that the total delay can be readily increased or decreased and may be continuously variable or include additional steps.

Figure 6:
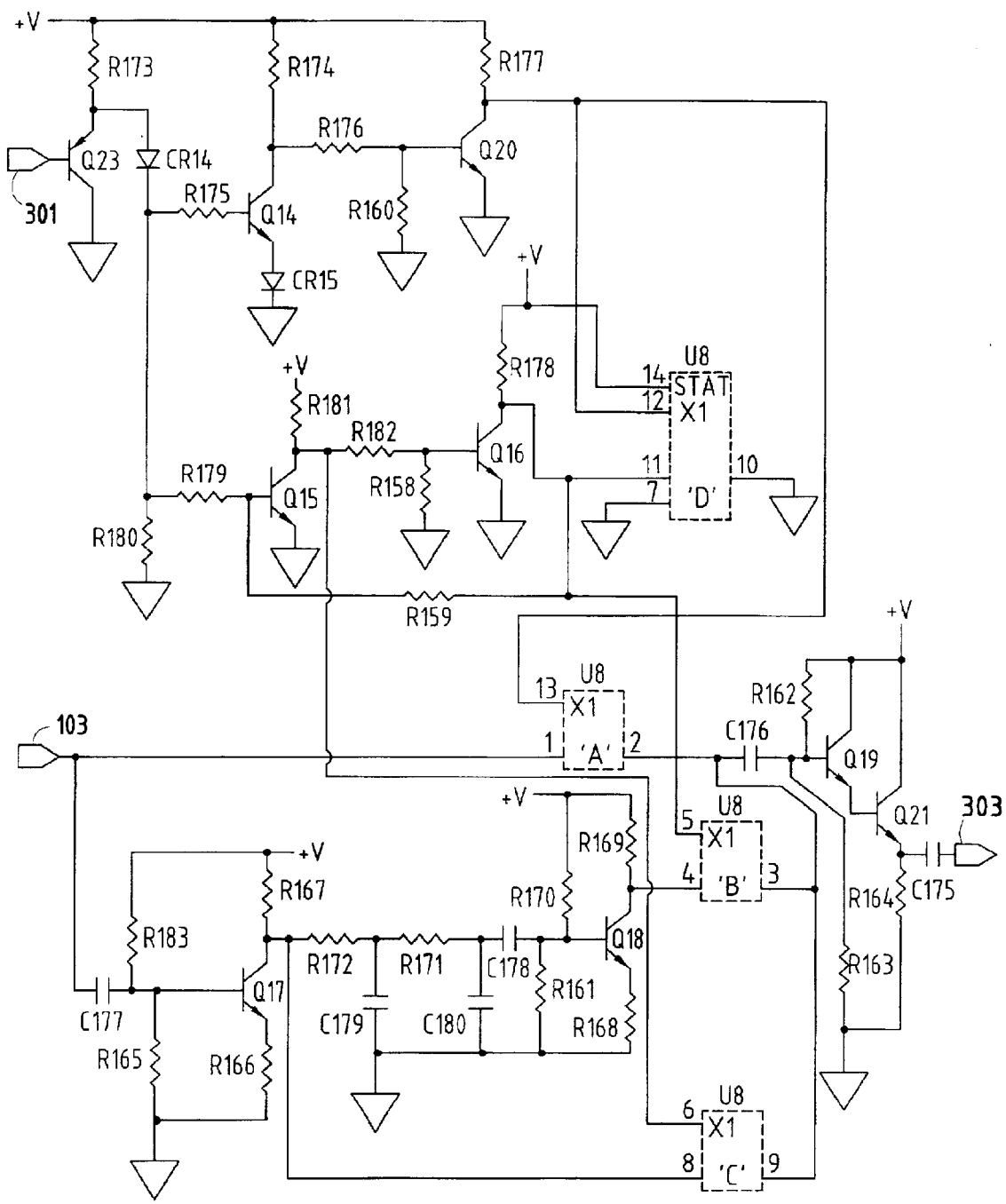
FIG. 6 is an electrical schematic of a phase compensation circuit, according to FIG. 5.

Turning to FIG. 6, an exemplary electrical schematic is illustrated that implements a phase compensation circuit 304B, according to FIG. 5. As shown in FIG. 6, a control signal 301 is received at the base of a PNP transistor Q23, which is configured as an emitter-follower and, as such, the voltage at the emitter of the transistor Q23 essentially follows the voltage at the base of the transistor Q23. A composite input signal 103 is provided to the base of a transistor Q17 (through a capacitor C177) and to an input of a switch 'A', located between pin 1 and pin 2, of a CMOS quad bilateral switch U8. An output of the switch 'A' is coupled to the base of a NPN transistor Q19, through a capacitor C176. The transistor Q19, in conjunction with a NPN transistor Q21 (and their associated components), provides an output buffer.

Since the voltage at the emitter of the transistor Q23 essentially follows the voltage at the base of the transistor Q23, when the level of the control signal 301 exceeds approximately 0.7 volts, a diode CR14 conducts. When the diode CR14 conducts, a bias voltage, which is dropped across a resistor R180 (preferably, 20 kΩ), is supplied to a base of a NPN transistor Q14 (through a resistor R175, preferably, 10 kΩ) and a base of a NPN transistor Q15 (through a resistor R179, preferably, 10 kΩ).

When the transistor Q15 is not conducting, a power supply voltage (+V), preferably, 8.5 volts, is supplied to a base of a NPN transistor Q16 (through a divider network that includes resistors R181, R182 and R158, whose preferred values are 10 kΩ, 100 kΩ and 18 kΩ, respectively). The divider network provides a bias voltage to the base of the transistor Q16 that causes the transistor Q16 to conduct, when the transistor Q15 is not conducting. When the transistor Q15 is conducting, the voltage at the collector of the transistor Q16 remains at or transitions to a high signal level.

Similarly, when the transistor Q14 is not conducting, the power supply voltage (+V) is supplied to a base of a NPN transistor Q20 (through a divider network that includes resistors R160, R174 and R176, whose preferred values are 5.1 kΩ, 10 kΩ and 10 kΩ, respectively). The divider network provides a bias voltage to the base of the transistor Q20 that causes the transistor Q20 to conduct, when the transistor Q14 is not conducting. When the transistor Q14 is conducting, the voltage at the collector of the transistor Q20 remains at or transitions to a high signal level.

The voltage at the collector of the transistor Q15 is provided to a control line (pin 6) of a switch 'C', located between pin 8 and pin 9 of the switch U8, and dictates whether the switch 'C' conducts. A high on the control line (pin 6) causes the switch 'C' to be in a low impedance state and a low on the control line (pin 6) causes the switch 'C' to be in a high impedance state. When switch 'C' is in a low impedance state, a full delay is provided to the composite input signal 103. The time period of the full delay is dictated by the transistor Q17 (which inverts the composite input signal 103) and its associated components.

The voltage at the collector of the transistor Q16 is provided to a control line (pin 5) of a switch 'B', located between pin 4 and pin 3 of the switch U8. A low signal level on the control line (pin 5) causes the switch 'B' to remain in or transition to a high impedance state. A high signal level on the control line (pin 5) causes, for example, a one-half delay to be selected. That is, the switch 'B' transitions to a low impedance state when a high signal level is present on the control line (pin 5).

The voltage at the collector of the transistor Q16 is also provided to the base of the transistor Q15, through a resistor R159 (preferably, −1 MΩ). The resistor R159 is implemented to provide feedback between the collector of the transistor Q16 and the base of the transistor Q15. In this manner, the resistor R159 creates a hysteresis effect, which reduces the effects of chatter and false triggering.

When the base-to-emitter voltage of the transistor Q15 rises above about 0.75 volts, the transistor Q15 begins to conduct and the voltage at the collector of the transistor Q15 begins to decrease. When the control signal 301 reaches a level of approximately 1.1 volts, the collector of the transistor Q15 transitions to a low signal level, which causes the transistor Q16 to turn off. This is because the voltage at the collector of the transistor Q15 determines the drive signal applied to the base of the transistor Q16. When the transistor Q16 turns off, the voltage at its collector is pulled to a high signal level, through a resistor R178 (preferably, 10 kΩ).

As previously mentioned, the signal at the collector of the transistor Q16 is provided to the control line (pin 5) of the switch 'B'. When the signal on the control line (pin 5) is at a high level, the switch 'B' is in a low impedance state and a one-half delay is selected. When a one-half delay is selected, the composite input signal 103 propagates through the transistor Q17 (where it is inverted) and through transistor Q18 (where it is inverted again) before reaching the input of the switch 'B'. The signal then propagates through the switch 'B' to an output buffer stage (i.e., the transistors Q19 and Q21 and their associated components). Thus, a one-half delay is set by the frequency response of the transistor Q17 (and its associated components) and the transistor Q18 (and its associated components). Preferably, the circuitry associated with both the transistors Q17 and Q18 is designed to provide a minimal gain to offset any attenuation of the composite input signal 103. The gain is a function of the control signal and increases as the bandwidth of the IF filter narrows.

When the control signal 301 at the base of transistor Q23 reaches approximately 1.4 volts, the transistor Q14 begins to conduct and the collector of the transistor Q14 transitions to a low signal level, which causes the transistor Q20 to turn off and the collector of the transistor Q20 transitions to a high signal level. The high signal level at the collector of the transistor Q20 is provided to a control line (pin 13) of the switch 'A', located between pin 1 and pin 2 of the switch U8. A high signal level on the control line (pin 13) causes the switch 'A' to transition to a low impedance state and provide a phase compensated composite output signal 303 that is not delayed with respect to the composite input signal 103. The collector of the transistor Q20 is also coupled to a control line (pin 12) of a switch 'D', located between pin 11 and 10 of switch U8. When a high signal level is provided on the control line (pin 12), the switch 'D' transitions to a low impedance state. Since the input of the switch 'D' is coupled to the collector of the transistor Q16 and the output of switch 'D' is coupled to ground, the collector of transistor Q16 is pulled to ground. As previously mentioned, the collector of the transistor Q16 is also coupled to the control line (pin 5) of the switch 'B'. A low on the control line (pin 5) causes the switch 'B' to transition to a high impedance state. Thus, when the transistor Q20 is not conducting, the composite input signal 103 is passed without delay to the output buffer, which includes resistors R162, R163 and R164 (whose preferred values are 300 kΩ, 510 kΩ and 300Ω, respectively) and transistors Q19 and Q21.

As previously discussed, the time delay is designed to be an appropriate delay based upon the maximum delay of the IF filter used, at the frequency utilized by the ARS. As previously discussed, the control signal 301 provided to the base of the transistor Q23 determines which of the switches in the switch U8 are activated and, as such, the amount of delay that is selected for the composite input signal 103.

To summarize, when the control signal 301 is below a set high threshold level (e.g., 1.4 volts), the transistor Q20 conducts, which causes the voltage at the collector of the transistor Q20 to go low. While the voltage at the collector of the transistor Q20 is low, the signal at the control lines (pin 12 and pin 13) of the switch U8 are at a low level and the switch 'A' and the switch 'D' are in a high impedance state. When the control signal 301 reaches a set lower threshold level (e.g., 0.75 volts), the transistor Q15 conducts, which causes the voltage at the collector of transistor Q15 to transition to a low signal level. When the voltage at the collector of transistor Q15 goes low, the signal at the control line (pin 6) of switch U8 transitions to a low signal level and the switch 'C' transitions to a high impedance state. At approximately the same time, the transistor Q16 turns off and the voltage at the control line (pin 5) of switch U8 transitions to a high signal level, which causes the switch 'B' to transition to a low impedance state. With a low on the control line (pin 5) of the switch 'B', a half-delay is selected for the composite input signal 103. As previously mentioned, the delay of the composite input signal 103 is determined by the frequency response of the transistors Q17 and Q18, as set by their associated components (e.g., capacitor C177 and resistors R165, R166, R167 and R183 and resistors R161, R168, R169, R170, R171 and R172 and capacitors C178, C179 and C180). Preferred values for the resistors R165, R166, R167, R183, R161, R168, R169, R170, R171 and R172 are 20 kΩ, 910Ω, 1.2 kΩ, 33 kΩ, 5.1 kΩ, 820Ω, 4.3 kΩ, 27 kΩ, 4.3 kΩ and 4.3 kΩ, respectively. Preferred values for the capacitors C177, C178, C179 and C180 are 0.1 uF, 0.1 uF, 1000 pF and 1000 pF, respectively.

When the control signal 301, provided to the base of transistor Q23, is equal to or greater than a high threshold (e.g., 1.4 volts), the transistor Q20 turns off, which causes the collector of the transistor Q20 to transition to a high signal level. The high signal level is provided to the control line (pin 13) of the switch 'A', which provides a low impedance path to the buffer section. Contemporaneously, the high signal level at the collector of the transistor Q20 is provided to the control line (pin 12) of the switch 'D'. This causes the collector of the transistor Q16 to be coupled to ground (with the switch 'D') and the switch 'B' transitions to a high impedance state.

Accordingly, a phase compensation circuit has been described that includes a delay circuit that is designed to provide an appropriate delay at a frequency dictated by an adaptive reception system (ARS), whose control circuit selects the delay based upon the level of a control signal provided by a dynamic IF filter of an FM receiver. In this manner, the phase compensation circuit can automatically provide an appropriate delay to compensate for the phase shift induced by the dynamic IF filter. The above-described phase compensation circuit is particularly advantageous when employed in a mobile FM reception system implemented within a motor vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A phase compensation circuit, comprising:
   a delay circuit receiving a composite input signal that exhibits a variable phase error, the delay circuit providing a plurality of selectable discrete delays; and
   a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal, and wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, where the phase compensated composite output signal is provided to the ARS to phase align the plurality of transmitted signals received through the plurality of antennas; and
   an output buffer, the output buffer receiving and amplifying the delayed composite input signal.

2. A phase compensation circuit, comprising:
   a delay circuit receiving a composite input signal that exhibts a variable phase error, the delay circuit providing a plurality of selectable discrete delays;
   a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal; and
   an output buffer, the output buffer receiving and amplifying the delayed composite input signal to provide a phase compensated composite output signal.

3. The circuit of claim 2, wherein at least one of the plurality of selectable discrete delays also amplifies the composite input signal as a function of the control signal.

4. The circuit of claim 2, wherein the composite input signal is a frequency modulation (FM) composite input signal.

5. The circuit of claim 4, wherein the composite input signal is provided by a detector of an FM receiver and the phase error associated with the composite input signal is introduced when the bandwidth of an intermediate frequency (IF) filter of the FM receiver is dynamically varied.

6. The circuit of claim 2, wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, and wherein the phase compensated composite output signal is provided to the ARS to phase align the plurality of transmitted signals received through the plurality of antennas.

7. A method for providing phase compensation of a signal, comprising the steps of:
   providing a delay circuit for receiving a composite input signal that exhibits a variable phase error, the delay circuit providing a plurality of selectable discrete delays;
   providing a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay Is utilized to delay the composite input signal to provide a phase compensated composite output signal, and wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, where the phase compensated composite output signal is provided to the ARS to phase align the plurality of transmitted signals received through the plurality of antennas, and
   providing an output buffer, the output buffer receiving and amplifying the delayed composite input signal.

8. A frequency modulation (FM) reception system, comprising:
   a phase compensation circuit, including:
      a delay circuit receiving an FM composite input signal that exhibits a variable phase error, the delay circuit providing a plurality of selectable discrete delays;
      a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal;
   an FM receiver coupled to and providing the composite input signal to the delay circuit of the phase compensation circuit;
   an adaptive reception system (ARS) that receives a plurality of transmitted signals each through one of a plurality of antennas and provides a composite received signal to an input of the FM receiver, and wherein the phase compensated composite output signal Is provided to the ARS to phase align the plurality of transmitted signals received through the plurality of antennas and
   an output buffer, the output buffer receiving and amplifying the delayed composite input signal.

9. A phase compensation circuit, comprising:
   a delay circuit receiving a composite input signal that exhibits a variable phase error, the delay circuit providing a plurality of selectable discrete delays; and a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal, and wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, where the phase compensated composite output signal is provided to the ARS to phase align the plurality of transmitted signals received through the plurality of antennas; and wherein at least one of the plurality of selectable discrete delays also amplifies the composite input signal as a function of the control signal.

10. A phase compensation circuit, comprising:

a delay circuit receiving a composite input signal that exhibits a variable phase error, the delay circuit providing a plurality of selectable discrete delays; and a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal and wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, where the phase compensated composite output signal is provided to the ARS to phase align the plurality of transmitted signals received through the plurality of antennas, wherein the composite input signal is a frequency modulation (FM) composite input signal provided by a detector of an FM receiver and the Phase error associated with the composite input signal is introduced when the bandwidth of an intermediate frequency (IF) filter of the FM receiver is dynamically varied.

11. A method for providing phase compensation of a signal, comprising the steps of:

providing a delay circuit for receiving a composite input signal that exhibits a variable phase error, the delay circuit providing a plurality of selectable discrete delays; and providing a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal, and wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, where the phase compensated composite output signal is provided to the ARS to phase align the plurality of transmitted signals received through the plurality of antennas, wherein at least one of the plurality of selectable discrete delays also amplifies the composite input signal as a function of the control signal.

12. A method for providing phase compensation of a signal, comprising the steps of:

providing a delay circuit for receiving a composite input signal that exhibits a variable phase error, the delay circuit providing a plurality of selectable discrete delays; and providing a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal, and wherein the composite input signal is provided by a detector of an FM receiver whose input is coupled to an adaptive reception system (ARS) that receives a plurality of transmitted signals each through one of a plurality of antennas and provides a composite received signal to the input of the FM receiver, where the phase compensated composite output signal is provided to the ARS to phase align the plurality of transmitted signals received through the plurality of antennas, wherein the composite input signal is a frequency modulation (FM) composite input signal provided by a detector of an FM receiver and the phase error associated with the composite input signal is introduced when the bandwidth of an intermediate frequency (IF) filter of the FM receiver is dynamically varied.

13. A frequency modulation (FM) reception system, comprising:

a phase compensation circuit, including:

a delay circuit receiving an FM composite input signal that exhibits a variable phase error, the delay circuit providing a plurality of selectable discrete delays; and a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal;

an FM receiver coupled to and providing the composite input signal to the delay circuit of the chase compensation circuit; and an adaptive reception system (ARS) that receives a plurality of transmitted signals each through one of a plurality of antennas and provides a composite received signal to an input of the FM receiver, and wherein the phase compensated composite output signal is provided to the ARS to phase align the plurality of transmitted signals received through the plurality of antennas wherein at lest one of the plurality of selectable discrete delays also amplifies the composite input signal as a function of the control signal.

14. A frequency modulation (FM) reception system, comprising:

a phase compensation circuit, including:

a delay circuit receiving an FM composite input signal that exhibits a variable phase error, the delay circuit providing a plurality of selectable discrete delays; and a control circuit coupled to the delay circuit, the control circuit receiving a control signal whose value corresponds to the phase error associated with the composite input signal, the control circuit selecting one of the plurality of selectable discrete delays responsive to the control signal, wherein the selected delay is utilized to delay the composite input signal to provide a phase compensated composite output signal;

an FM receiver coupled to and providing the composite input signal to the delay circuit of the chase compensation circuit; and an adaptive reception system (ARS) that receives a plurality of transmitted signals each through one of a plurality of antennas and provides a composite received signal to an input of the FM receiver, and wherein the phase compensated composite output signal is provided to the ARS to phase align the plurality of transmitted signals received through the plurality of antennas wherein at least one of the plurality of selectable discrete delays also amplifies the composite input signal as a function of the control signal.

* * * * *